UNITED STATES PATENT OFFICE.

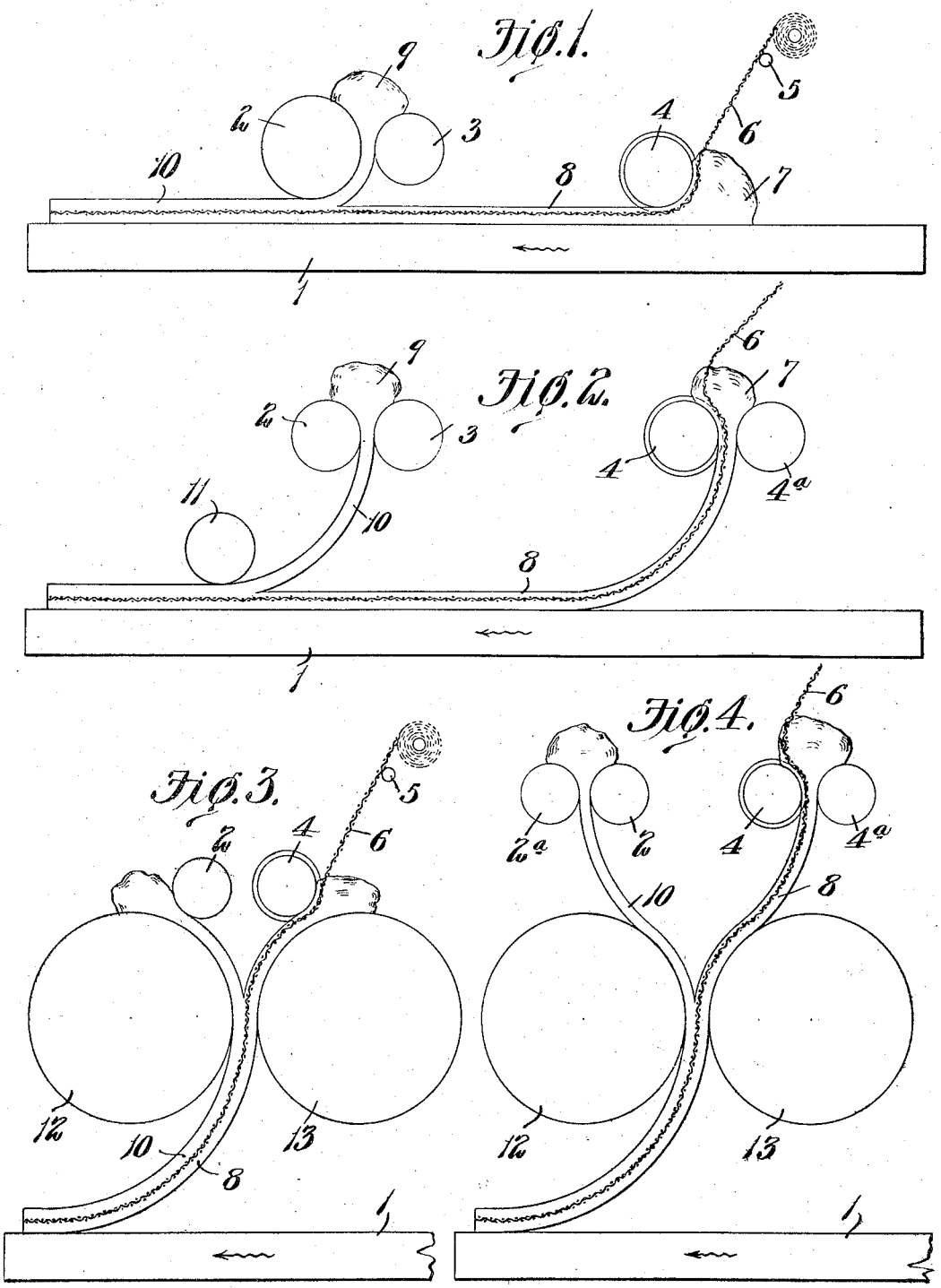

ROBERT A. B. WALSH, OF ST. LOUIS, MISSOURI.

METHOD OF AND MACHINE FOR MAKING WIRE-GLASS.

940,837.   Specification of Letters Patent.   Patented Nov. 23, 1909.

Application filed December 2, 1907. Serial No. 404,845.

*To all whom it may concern:*

Be it known that I, ROBERT A. B. WALSH, a citizen of the United States, residing at St. Louis, Missouri, have invented a certain new and useful Improvement in Methods of and Machines for Making Wire-Glass, of which the following is a full, clear, and exact description, such as will enable others skilled in the art to which it appertains to make and use the same, reference being had to the accompanying drawings, forming part of this specification, in which—

Figures 1, 2, 3 and 4 are side elevations of different forms of apparatus which may be used in practicing my invention and Fig. 5 is a conventional illustration of the embedding roller.

This invention relates to a new and useful method of, and a machine for making wire glass, and particularly wire glass in which a plurality of layers are employed to form the ultimate sheet.

The object of my invention is to produce a sheet of wire glass having smooth brilliant surfaces, the wire of said sheet retaining its original bright and new appearance after it has been embedded in the glass.

In the manufacture of wire glass, the tendency of the wire is to contract and "draw" the glass so as to produce an uneven or an irregular surface. It has been proposed, see for illustration the patent to Walsh No. 610,593, dated September 13, 1898, to cure these irregularities by smoothing them down by a finishing roller; but this cannot always be successfully accomplished, because, while the finishing roller acts upon the elevations, it will not perfectly transfer the surplus glass to the depressions and make a perfect weld. It has also been proposed, see for illustration the Schmertz reissue patent No. 12,443, dated January 30, 1906, to press the wire mesh into the top surface of a first formed sheet or layer of glass and then spread a finishing layer or sheet of molten glass thereover. This method produces a better and smoother finish to the top surface of the sheet than the Walsh method first mentioned. In both of these methods, the wire, on account of its exposure to atmosphere after being heated loses its bright and new appearance and looks black in the finished sheet. In the Schmertz method the weld between the two layers occurs principally in the plane of the wire, and as the wire is at places left free to "draw" this action is sometimes observed on the surface of the second layer.

Briefly stated, my present invention contemplates the method of, and an apparatus for forming a sheet of glass having wire mesh buried therein and thereafter forming a second sheet or layer of glass and welding it to the uneven surface of the sheet in which the wire mesh is embedded. Preferably the wire mesh is embedded in the upper surface of the first formed sheet or layer at the time that said sheet is being made so that in its heated condition the wire mesh will not be exposed to atmosphere and will accordingly preserve its bright and new appearance in the glass.

It is obvious that my invention is not limited to a single type of machine, but may be embodied in different forms of apparatus. I have shown several of these forms in the accompanying drawings, and will first refer to that shown in Fig. 1, which comprises a table 1, having a smooth surface roller 2 arranged above the upper surface thereof at a distance equal to the thickness of the finished product and a smooth surface roller 3 arranged adjacent to the roller 2 and adapted to coöperate therewith to form the top layer of the finished sheet. Said apparatus also comprises an embedding roller 4 which coöperates with the table to form the bottom layer and embed the wire mesh therein and a roller 5 for guiding the wire mesh that is embedded in the bottom layer. In practicing my invention with apparatus of this description a wire mesh 6 is arranged underneath the embedding roller 4 and a ladleful of molten glass 7 is dumped onto the table adjacent said embedding roller. The table is then moved longitudinally in the direction of the arrow in Fig. 1 thereby causing the mass of glass 7 to be formed into a bottom layer or sheet 8 by means of the embedding roller 4 which forces the wire mesh into the upper surface of said layer so that it is completely covered. When the end of said layer or sheet reaches the rollers 2 and 3 a mass of molten glass 9 is poured between said rollers so as to produce a top layer 10 which falls onto the upper surface of the bottom layer and is welded thereto by the roller 2. From the foregoing it will be seen that two independent masses of molten glass are formed progressively into two layers which are combined together to produce a single sheet. The roller 4 due to the embedding blades thereon, will force the wire mesh below the upper surface of the bottom layer 8 simultaneously with forming said layer so that said wire mesh will be completely covered by glass and thus be prevented from oxidizing, as would be apt to occur if it were exposed to the air while in its heated condition.

Although I have previously stated that the table is moved longitudinally, it will of course be understood that this table could be stationary and the rollers moved longitudinally thereof without departing from the spirit of my invention.

In Fig. 2 I have shown another form of apparatus which can be used for practicing my method. This apparatus comprises two smooth surface rollers 2 and 3 for forming the top layer or finishing layer 10 and an embedding roller 4 and a smooth surface roller 4ª for forming the bottom layer 8 and embedding the wire mesh therein, the two layers being combined together to form a single sheet by means of a smooth surface roller 11 that is arranged above the table 1.

In Fig. 3 I have shown still another form of apparatus which can be used for practicing my method. This apparatus consists of two smooth-surface rollers 12 and 13 spaced apart a distance equal to the thickness of the finished product, an embedding roller 4 coöperating with the roller 13 to form the bottom layer and bury the wire mesh in the upper surface thereof and a smooth surface roller 2 coöperating with the roller 12 to form the top layer, the rollers 12 and 13 also operating to combine the two layers together to form a single sheet. Instead of having the embedding roller 4 coöperate with the roller 13 to form the bottom layer 8 and embed the wire mesh therein and the roller 2 coöperate with the roller 12 to form the top layer, said embedding roller and smooth surface roller 2 can coöperate with supplemental smooth surface rollers 4ª and 2ª as in the apparatus shown in Fig. 4 and the two rollers 12 and 13 be used simply to combine the two layers together.

It will be observed from the foregoing that a complete sheet of wire glass is first formed, to-wit, a sheet or layer of glass with wire buried beneath its upper surface and finally a finishing layer of glass is formed and combined with the previously formed sheet or layer, the finishing layer of glass filling in the spaces in the upper surface of the first formed sheet and becoming thoroughly welded thereto. Thus the tendency of the wire to "draw" the glass in contracting, and produce an irregular or uneven surface on the first formed sheet is corrected by the second layer, which not only fills in the unevenness in the first formed sheet, but said second layer more readily partakes and retains the smooth even surface imparted by the finishing roller.

By referring to Fig. 5 it will be noted that the embedding roller marked 4 is provided with embedding blades which are preferably made thin, deep and tapering to a knife edge so that they will have the least amount of surface contact with the wire to be embedded. These embedding blades are also spaced as far apart as is practicable and yet sufficiently close together so that they will uniformly bury the wire beneath the upper surface of the first formed sheet or layer of glass. From the above it will be noted that the embedding roller which I propose to use is not a corrugated roller in the sense that said term is usually understood in this art, particularly with respect to the manufacture of "wash-board" glass. An ordinary corrugated roller, that is, one whose contour is in the shape of a sinusoidal curve and which is used to make glass plates for use in wash-boards would not answer the purpose of an embedding roller to perform the functions of an embedding roller illustrated in Fig. 5 for the reason that the corrugations as a general rule are too close together and present too large an area for surface contact with the wire, in consequence of which the wire would not be embedded or buried beneath the surface, but would merely occupy a position where it would be exposed between the protuberances formed by such corrugated roller. The exposure of the wire to the atmosphere after the wire is heated by contact with the glass, is what I seek to avoid. The complete burying of the wire beneath the surface of the first formed sheet or layer is what I seek to do, and this is done by the embedding blades of the roller 4.

By reference to Fig. 5 it will be seen that the glass does not entirely fill the spaces between the embedding blades and thus there are left on the upper surface of the first formed sheet or layer soft or unchilled protrusions, which have not been in contact with the metal of the embedding roller.

Having thus described my invention, what I claim is:—

1. An apparatus of the character described comprising means for forming a sheet of glass, means for then embedding wire therein, and means for forming another sheet or layer of glass and welding the same to said first formed sheet; substantially as described.

2. An apparatus for making wire glass, the same comprising means for rolling a plurality of masses of molten glass into layer form, forcing a wire mesh below the surface of one of said layers so that it is completely covered, and thereafter combining said layers into a single sheet; substantially as described.

3. An apparatus of the character described comprising means for making a sheet of glass having wire buried beneath its surface, one surface of said sheet also having regularly spaced protrusions on its surface, and means for forming another sheet of glass and welding said other sheet of glass to the protrusion-bearing surface; substantially as described.

4. An apparatus of the character described comprising means for forming a sheet of glass, means for burying wire beneath the upper surface of said sheet, and means for forming another sheet or layer of glass and welding it to the uneven upper surface of said first formed sheet; substantially as described.

5. An apparatus of the character described comprising means for forming a sheet of glass and simultaneously forcing a wire mesh into the upper surface thereof so that it is completely covered, and means for forming a second sheet or layer of glass and welding it to the upper surface of the first formed sheet; substantially as described.

6. An apparatus of the character described comprising means for forming a layer of glass and embedding a wire mesh in the upper surface thereof so that it is completely covered, means for forming a finishing layer of glass, and means for combining said layers together; substantially as described.

7. An apparatus of the character described comprising an embedding roller and coöperating means for forming a layer of glass and forcing a wire mesh into the upper surface thereof so that it is completely covered, a pair of rolls for forming a second layer of glass and means for welding said second layer to the upper surface of the layer in which the wire mesh is embedded; substantially as described.

8. The method of making wire glass consisting in forming a sheet of glass, embedding wire therein, and in forming another sheet of glass and welding the same to said first formed sheet; substantially as described.

9. The method of making wire glass consisting in rolling a plurality of masses of molten glass into layer form, introducing a wire mesh below the surface of one of said layers so that it is completely covered, and combining said layers into a single sheet; substantially as described.

10. The method of making wired glass which consists in rolling a plurality of masses of molten glass into layer form and simultaneously forcing a wire mesh below the surface of one of said layers so that it is completely covered, and thereafter merging said layers into a single sheet; substantially as described.

11. The method of making wire glass which consists in forming a mass of molten glass into a layer, forcing a wire mesh into the upper surface of said layer so that it is completely covered, forming a separate mass of molten glass into a layer and combining said layers together; substantially as described.

12. The method of making wire glass which consists in rolling a mass of molten glass into a layer or sheet and simultaneously embedding a wire mesh in the upper surface of said sheet so that it is completely covered, rolling an independent mass of molten glass into a top layer, and thereafter combining said layers together to form a single sheet; substantially as described.

In testimony whereof I hereunto affix my signature in the presence of two witnesses, this twenty-sixth day of November 1907.

ROBERT A. B. WALSH.

Witnesses:
F. R. CORNWALL,
GEORGE BAKEWELL.